Oct. 4, 1938.  W. WICKNICK ET AL  2,132,279
VEHICLE SEAT TABLE
Filed Sept. 15, 1936
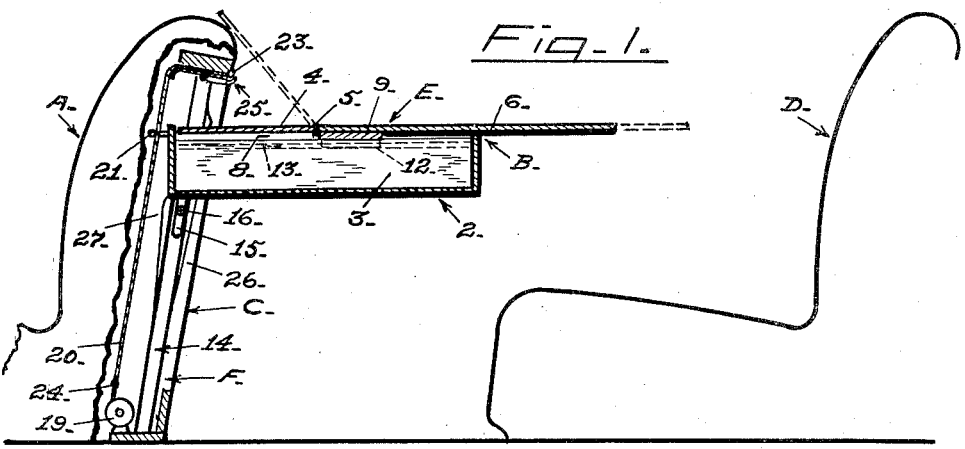
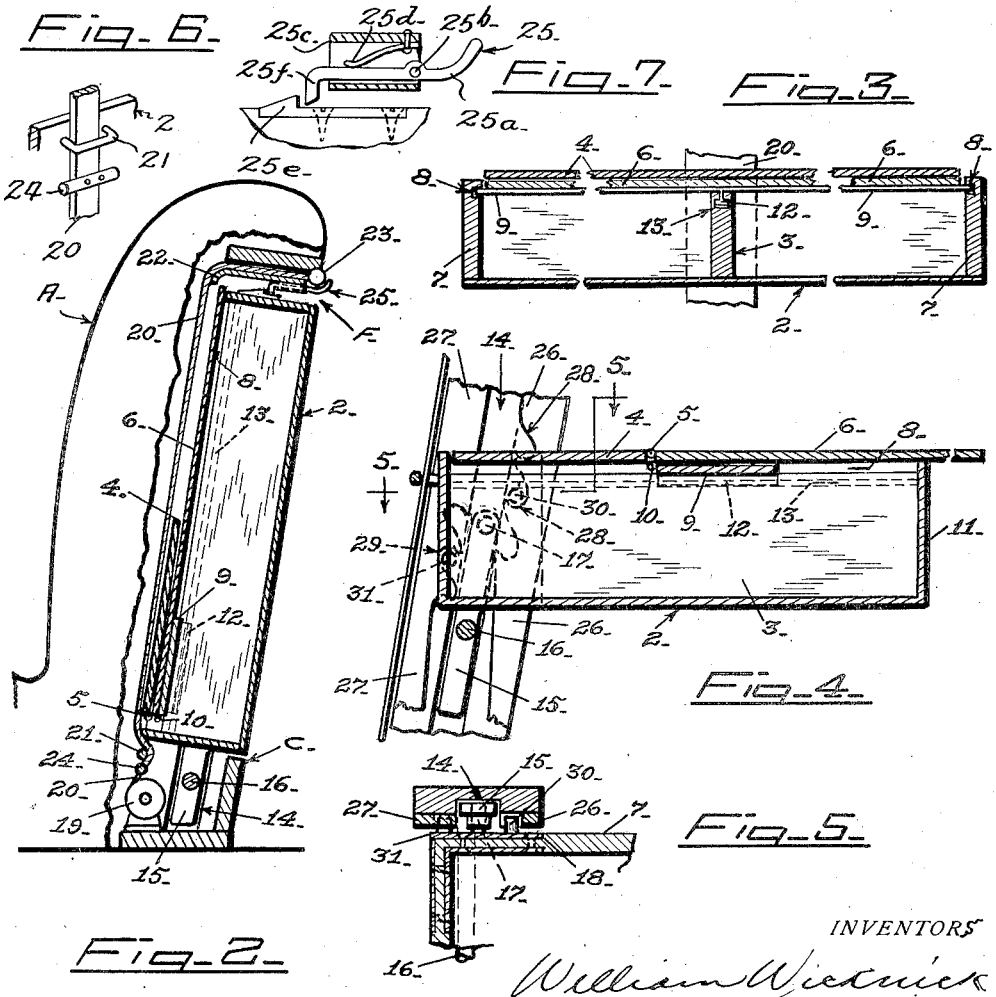
INVENTORS
William Wicknick
Harry R. Fry Patented Oct. 4, 1938

2,132,279

UNITED STATES PATENT OFFICE 2,132,279

VEHICLE SEAT TABLE

William Wicknick and Harry R. Fry,
Los Angeles, Calif.

Application September 15, 1936, Serial No. 100,904

7 Claims. (Cl. 155—123)

This invention relates to and has for an object thereof the provision of a vehicle seat table which is carried by the back of one seat and is extensible from an out-of-the-way position to a position permitting of convenient use thereof by an occupant or occupants of a seat next rearward thereof.

Another object of this invention is to provide a table of the character described which may be readily and easily incorporated with the seat backs on trains, automobiles, planes and other passenger vehicles having rows of seats and mounted so that it may be concealed in said backs when not in use.

A further object is to provide a seat-table of the character described which may be readily adjusted as to height when in position of use and also adjusted as to size and extent towards the seat next rearward thereof, it being possible to have the table overlie a portion of said rearward seat or extend a lesser distance from said seat back as desired, to suit the particular user and other conditions at hand.

Another object is to provide a seat-table such as described which may include as a part thereof a storage drawer or receptacle for food, utensils, or various other articles and commodities.

Yet another object is to provide a seat-table such as described wherein a novel means is employed for raising the table from concealed or out-of-way position into position of use.

A still further object is to provide a seat-table which includes an efficient and simple means for vertically adjustably locking and rigidly supporting the table in extended position from the seat back without the use of legs or the like.

Another object is to provide a seat-table having a sectional table top which serves as a lid or cover for the storage receptacle as well as a means for varying the size and the extent of the table from the seat back.

With the above and other objects in view the invention consists in the novel construction and combination of parts hereinafter described, illustrated in the accompanying drawing, and set forth in the claims hereto appended, it being understood that various changes in form, proportion, size and minor details of construction within the scope of the claims may be resorted to without departing from the spirit or sacrificing any of the advantages of the invention.

In the drawing:

Figure 1 is a fragmentary elevation of the interior of a vehicle showing portions of two seats and the table of this invention as when fully extended for use, the said table and associated parts being shown in section.

Figure 2 is a fragmentary view of a vehicle seat having the table concealed in the back thereof and shown in vertical section.

Figure 3 is a cross section of the table taken at right angles to that of Figure 1.

Figure 4 is a fragmentary enlarged sectional view taken at right angle to Figure 3 and showing the means for attaching the table to and adjustably supporting it in extended position from the seat back.

Figure 5 is a sectional view taken on the plane of line 5—5 of Figure 4.

Figure 6 is a fragmentary perspective view showing the manner in which the cleat engages the guide.

Figure 7 is an enlarged sectional view of the latch.

The present embodiment of this invention as shown in the accompanying drawing generally comprises a vehicle seat A, and a table B attached to the back C of seat A, and being extensible from out-of-way position relative thereto to position for use by occupants of the seat D next rearward thereof.

As here shown the table B is normally concealed in the recessed back C so as to lie flush with the rear surface of said back and from such position is readily extensible to position of use either lying wholly forward of the front of the seat D or in position overlying said seat D, both as apparent in Figure 1.

If desired the table B may have, in addition to its sectional top E, a body in the form of a drawer or receptacle 2 having a partition 3.

With this arrangement the sectional top E is slidably mounted on and extensible from the receptacle 2 as indicated in Figure 1, the inner section 4 of said top being hinged at 5 so that it may be folded back upon the main section 6 as shown in Figure 2.

As here shown the side walls 7 of the drawer 2 have slots 8 extending the full length thereof for slidably receiving the shoe or support 9 to which the inner edge of the section 6 is hinged as at 10. This also provides for disposing the top flush with the upper edges of the side walls 7 and with the top overlying the front wall 11 of the drawer 2.

A T-shaped guide 12 is carried by the shoe portion 9 and is slidable in a similarly shaped groove 13 in the partition 3 whereby to securely hold the top and drawer slidably united.

The seat back C is provided with a recess F for reception of the table B and has vertical tracks 14 secured therein to slidably receive the shoes 15 joined by the cross rod 16 whereby the shoes and rod form an H-shaped vertically movable support for the table.

The inner end of the table is pivoted to the shoes 15 by means of the trunnions 17 on plates 18 secured to the side walls 7. It will now be seen that the table may be moved from the concealed position shown in Figure 2 to extended position shown in Figure 1 and vice versa.

As a means for raising and lowering the table a spring loaded roller 19 is provided at the bottom of the recess F and on which is wound a flexible element 20. This flexible element extends through a table carried guide 21 of any form suitable for slidably embracing said flexible element on the table B and thence upward around the upper side of the table and then out through a guide 22 to a position, where it may be grasped, on the rear wall of the seat back. A suitable button or holding piece 23 is affixed to said upper end of the flexible element.

On the flexible element is a cleat 24 which, when the said element is pulled outwardly, will contact the guide 21 and thereby raise the table, it being first necessary to release the latch 25, and then swing the upper end of the table outward so that it may be raised and extended as shown in Figure 1. The latch 25 as here shown comprises the usual co-operating portions fixed to the seat back and table respectively, whereby to latch the table within the seat back.

If desired the table may be provided with a handle or the like to facilitate the movement thereof out of the recess F. As here shown the latch 25 may serve this purpose. As shown in Figure 7, the latch 25 comprises a bolt 25a pivoted as at 25b in a body member 25c and held in latching position by a spring 25d. The bolt 25a co-operates with a latch member 25e fixed on the table and it is seen that on depressing the outer end of said latch bolt the end 25f will be moved clear of the member 25e and thereby release the table. Withdrawal of the button 23 may be effected when the outer end of the latch bolt is depressed as aforesaid.

To provide for vertically adjusting the table and to support it at different heights, opposed rails 26 and 27 are provided on opposite sides of each track 14 and have notches or shoulders 28 and 29 vertically spaced thereon. The notches on one side of each track 14 being in inverted and staggered relation to those on the other side of each track. On opposite sides of the trunnions 17 are stop pins 30 and 31 arranged one above the plane of the other and adapted to engage the shoulders 28 and 29 respectively. The pins 30 and shoulders 28 prevent the outer end of the table from swinging downward and the pins 31 and shoulders 29 prevent said end from swinging upward whereby the table will be firmly held in extended position.

It will be noted that the pins 30 and 31 are clear of said shoulders 28 and 29 when the table is substantially upright and even tilted outward sufficient to clear the upper end of recess F. Thus the table is freely movable up and down but when tilted or swung into horizontal position, the pins 30 and 31 are caused to engage with the shoulders 28 and 29 and the table will be locked in place as aforementioned. The several vertically spaced shoulders permit of adjusting the table at various levels as desired. It will be noted that the shoulders are so cut as to permit the pins 30 and 31 to be moved clear thereof by turning the table on its axes 17 as by swinging the outer end of the table upwardly from position shown in Figure 4, following which the said pins are free to slide between the rails 26 and 27 whereby the table may be swung into and lowered within the recess F. During this lowering operation the flexible element may be pulled out so that the cleat will engage the loop 21 and the flexible element may then be lowered to control the lowering of the table.

It is seen that the table may be used with the section 4 folded upon the section 6. In this position the table top, due to the hinge 10, serves as a hinged closure for the drawer 2 and may be easily raised to gain access to said drawer. When it is desired to extend the table top, it is moved forward the extent indicated by the dotted lines of Figure 1. When the top is thus extended, the section 4 will clear the top of the recess F and may be unfolded to lie in the plane of section 6 or swung from said plane into position lying upon the section 6. When the top is unfolded it may be pushed inwardly as shown in Figure 1, so that the section 4 will cover the portion of the drawer normally closed by the rear portion of section 6. In this way the table top may be extended to overlie a portion of the rear seat D and to increase the capacity of the table as well. In preparing the table for movement back into concealed position the entire top is pulled all the way out and the section 4 is then free to be folded down onto the section 6 and the top is then pushed back to normal position.

Occupants of the front seat; that is, the seat which carries the table, may, by turning around, have ready and convenient access to the table for various purposes.

The scope of this invention renders it particularly adaptable for use in the present day types of automobile and other vehicles in that the seat backs provide adequate hollow space for mounting of the table therein.

We claim:

1. The combination with a vehicle seat having a recess in the back thereof, of a receptacle, a table top thereon, connection means whereby the receptacle with said top thereon may be manually bodily moved as a unit from an upright position in said recess into a horizontal position extending rearwardly of said back, and means within said recess and on said receptacle for maintaining said receptacle in horizontal position at different heights, said connection means including members pivoted to said receptacle and slidable up and down in said recess, and tracks for guiding and slidably retaining said members in said recess.

2. The combination with a vehicle seat back having a recess, of a table, means securing an end of said table for movement bodily from the lower to the upper part of the recess whereby the table may be manually extended from upright position in said recess to a horizontal position, means for supporting the table in horizontal position, said first named means, including tracks in said recess, shoes pivoted to said end of said table, a spring loaded roller in said recess, a guide on said table, another guide fixed to said back at the upper end of said recess, a flexible element wound on said roller and being extended through and movable in said guides and having one end exposed whereby it may be grasped adjacent the guide on said back, and a cleat on said flexible element adapted to engage the guide on and lift said table upon appropriate movement of said flexible element.

3. The combination with a vehicle seat back having a recess, of a table, means for slidably retaining an end of said table in said recess whereby said table may be manually bodily moved from an upright position in said recess into a horizontal position extending rearwardly from said back, and means within said recess and on said table for releasably holding said table in horizontal position at different levels between upper and lower ends of said recess, said first named means including shoes pivotally mounted on said end of said table, and tracks in said recess for slidably retaining the shoes therein.

4. The combination with a vehicle seat back having a recess therein, of a table, means for slidably retaining an end of said table in said recess whereby said table may be manually bodily moved from upright position in said recess into horizontal position extending rearwardly of said back, including shoes pivoted on said end of said table and tracks in said recess for guiding said shoes, a spring loaded roller mounted in said recess, a flexible operating element normally wound on said roller and having its free end accessible for manual manipulation at the upper end of said recess, guide means on said back for slidably supporting said element, a guide fixed to said end of said table with said flexible element slidable therethrough, an abutment fixed on said flexible element and arranged to engage the guide on said table whereby to lift and lower the latter upon appropriate manual manipulation of said flexible element, and means in said recess and on said table for supporting said table in horizontal position.

5. The combination with a seat having a back provided with a recess, of a receptacle, means for slidably retaining one end of said receptacle in said recess whereby said receptacle may be manually bodily moved from an upright position in said recess into a horizontal position extending rearwardly from said back, said means including tracks in said recess, shoes pivoted to said end of said table and slidably engaged with said tracks, means in said recess and on said receptacle for holding the receptacle in horizontal position, a table top, a table top support extending across and being slidable on the upper side of said receptacle whereby the top may be manually extended clear of said recess and beyond the outer end of said receptacle, and hinge means for securing said top to said support, said top including hinged sections which are foldable one upon the other and unfoldable, when the top is extended clear of said recess.

6. The combination with a vehicle seat having a back provided with a recess, of a receptacle, a table top on said receptacle, upright tracks in said recess, shoes pivoted to said receptacle and slidably engaged with said tracks whereby said receptacle and top as a unit may be manually bodily moved from an upright position in said recess to a horizontal position extending rearwardly from said back, means in said recess and on said receptacle for holding said receptacle in horizontal position, and means whereby the top may be manually moved relative to said receptacle so as to clear said recess when said receptacle and top are in horizontal position, said top being formed of hinged sections one of which may be folded upon the other when clear of said recess and the other of which is extensible from said receptacle.

7. The combination with a seat having a back provided with a recess, upright guides at opposite sides of said recess, shoes slidable in said guides, a table having one end pivoted to and disposed between said shoes and movable bodily from upright position within the recess to horizontal position extending rearwardly of said back, and pins on said table, said upright members in said recess having notches at different levels therein to receive said pins to maintain said table in horizontally extended position at different levels.

WILLIAM WICKNICK.
HARRY R. FRY.